US011157740B1

(12) United States Patent
Agarwal et al.

(10) Patent No.: US 11,157,740 B1
(45) Date of Patent: Oct. 26, 2021

(54) AUGMENTED REALITY OBJECT MODEL CONFIGURATION BASED ON PLACEMENT LOCATION

(71) Applicant: A9.com, Inc., Palo Alto, CA (US)

(72) Inventors: Mukul Agarwal, San Francisco, CA (US); Kevin May, Oakland, CA (US); Xing Zhang, Santa Clara, CA (US); Karl Hillesland, San Carlos, CA (US); Simon Fox, Palo Alto, CA (US); Jack Mousseau, Palo Alto, CA (US); Kai Chieh Liu, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/990,872

(22) Filed: Aug. 11, 2020

(51) Int. Cl.
*G06K 9/00* (2006.01)
*G06K 9/20* (2006.01)
*G06F 3/0484* (2013.01)
*G06F 3/0482* (2013.01)

(52) U.S. Cl.
CPC ....... *G06K 9/00671* (2013.01); *G06F 3/0482* (2013.01); *G06F 3/04845* (2013.01); *G06F 3/04847* (2013.01); *G06K 9/2036* (2013.01)

(58) Field of Classification Search
CPC .............. G06K 9/00671; G06K 9/2036; G06F 3/04845; G06F 3/04847; G06F 3/0482; G06T 19/006
See application file for complete search history.

(56) References Cited

U.S. PATENT DOCUMENTS

| 10,672,191 | B1* | 6/2020 | Besecker | G06T 19/006 |
| 2012/0249741 | A1* | 10/2012 | Maciocci | G06T 15/503 348/46 |
| 2014/0333666 | A1* | 11/2014 | Poulos | G06F 3/147 345/633 |
| 2017/0323488 | A1* | 11/2017 | Mott | G06T 19/006 |
| 2020/0082633 | A1* | 3/2020 | Rom | G06T 17/10 |
| 2020/0226823 | A1* | 7/2020 | Stachniak | G06T 19/006 |
| 2020/0257245 | A1* | 8/2020 | Linville | G06F 3/04815 |

* cited by examiner

*Primary Examiner* — William A Beutel
(74) *Attorney, Agent, or Firm* — Kilpatrick Townsend & Stockton LLP

(57) ABSTRACT

Systems and methods for displaying digital objects in multiple configurations based on a placement location within an Augmented Reality (AR) display. The systems are enabled to receive image data, identify multiple horizontal surfaces within the image data, and place a digital object model within the image data. The digital object model is placed in the AR display in a first configuration when placed with an anchor of the digital object model on a first horizontal surface and in a second configuration when placed with the anchor on a second horizontal surface.

20 Claims, 13 Drawing Sheets ns; FIG. 12 depicts a flow diagram illustrating a process for automatically configuring a digital object based on the object placement location in accordance with at least some embodiments;

FIG. 13 illustrates an environment in which various embodiments can be implemented.

AUGMENTED REALITY OBJECT MODEL CONFIGURATION BASED ON PLACEMENT LOCATION

BACKGROUND

Augmented reality (AR) is a field of computer applications which deals with the combination of images of real world objects and computer generated object models. Many augmented reality applications are concerned with the use of streaming image information which is digitally processed and augmented by the addition of computer object models. For instance, an augmented reality user may utilize a user device upon which the user may see the real world displayed as an image together with object model images projected on top of that real world image.

BRIEF DESCRIPTION OF THE DRAWINGS

Various embodiments in accordance with the present disclosure will be described with reference to the drawings, in which.

DETAILED DESCRIPTION

Figure 1:
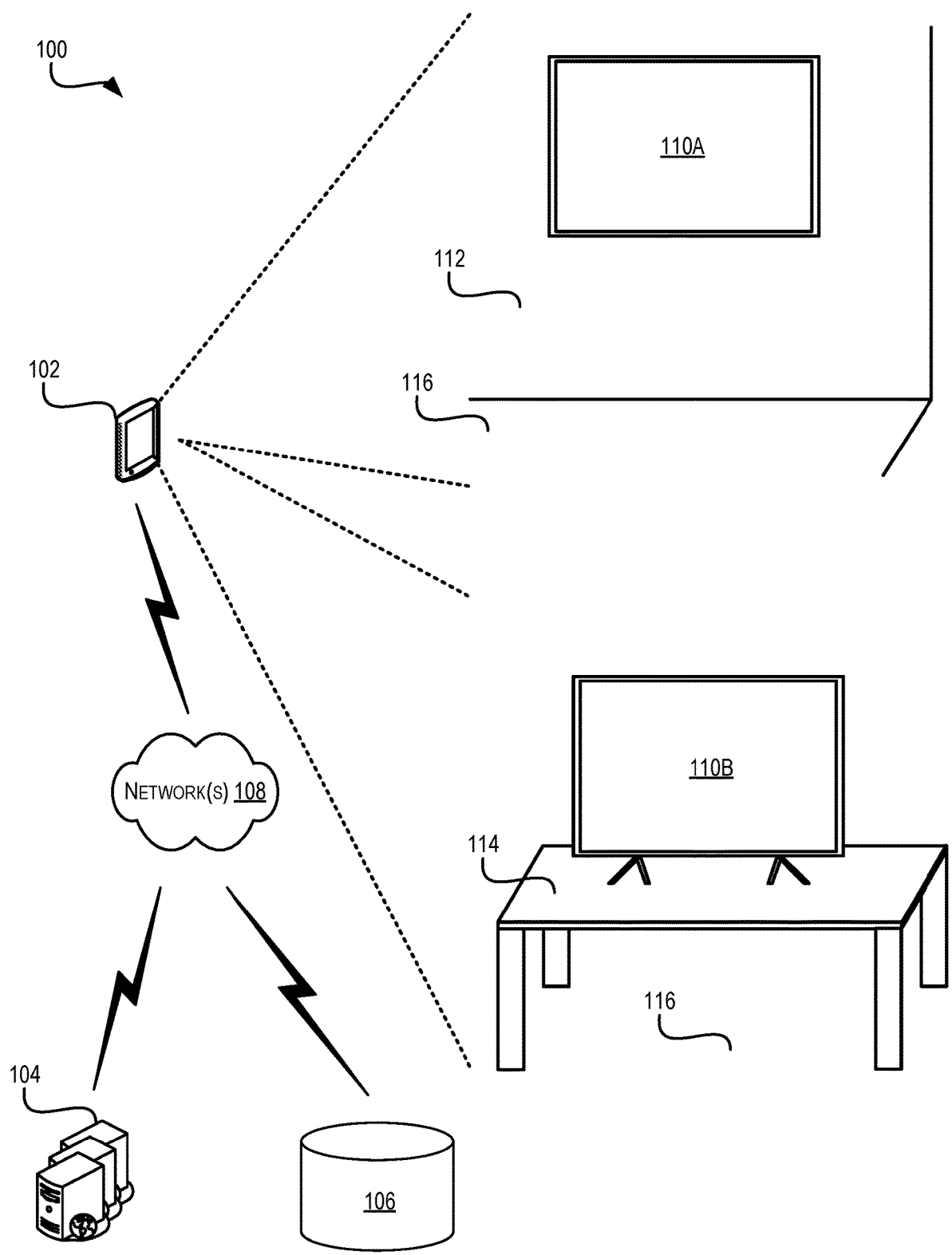
FIG. 1 depicts an illustrative example of a system that configures objects based on a placement location of a digital object in a scene in accordance with at least some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein include a system and techniques by which a digital object placed in a scene of an augmented reality (AR) system is automatically configured based on a placement location. In some typical AR systems, objects, especially wall-mounted objects, can only be placed on a single wall and cannot switch between locations on a wall and on a tabletop surface. Additionally, the user typically needs to specify a single wall on which to place the digital object at the start of the AR session and to restart the session to place the digital object on a different wall. Furthermore, many typical AR systems are not capable to accurately detect walls within a scene because of a lack of features on the wall useful for identifying the walls. Techniques and systems described herein enable, via a graphical user interface (GUI), placement of a digital object on a supporting surface such as a tabletop as well as on a vertical surface, like a wall. The GUI enables sensors of a user device to detect surface in a scene. The GUI then enables placement of a digital object into the scene with an anchor for the digital object. The anchor is used to place and orient the digital object within the scene. The anchor can be aligned with a wall, such as at the base of the wall for a user to place the digital object on the wall. The anchor can also be placed on a tabletop or other surface other than a floor surface to place the digital object in a different location. In some examples, the digital object may include a first supporting structure for connecting to a wall, such as a bracket. the first supporting structure may not be visible in the digital object in the AR system. The digital object may also include a second supporting structure for resting on a tabletop or other horizontal surface. The second supporting structure may include a stand for the digital object that is depicted in the digital object model and shown in the AR system.

By way of illustration, consider a scenario in which the system is implemented by a user with a mobile device capable of enabling an AR system for viewing a scene and placing digital objects within the scene. In this scenario, a user may be shopping for a consumer device, such as a television, and wanting to visualize what the television will look like within a particular room in the user's home. The user may be shopping for the television on the mobile device, for example from an online retailer. The GUI enables a user to select a button on the user device to access a digital object of the user device for placement into an AR scene on the GUI of the user device generated using a camera of the user device as well as the digital object. Following prompts on GUI of the user device, the user points the camera of the user device at the scene, specifically at a floor of the scene to identify the floor as well as other horizontal surfaces within the scene. The GUI then enables placement of the digital object into the scene as depicted on the user device. The digital object is placed with an anchor that is positionable and rotatable within the scene to adjust the placement of the television. The anchor rests directly below the television. When the anchor is positioned on the floor of the scene, the television is configured in a first configuration for attaching to a wall within the scene. When the anchor is positioned on a horizontal surface other than the floor, the television is configured in a second configuration including a stand for supporting the television against the horizontal surface. The digital model of the television is updated based on the configuration and viewable by the user within the scene on the user device. The GUI enables the user to change the horizontal (x-y) position of the television by moving the anchor. The GUI also enables the user to change the relative angle of the television by rotating the anchor. The GUI further enables adjustment of the height and position on a surface of a wall after a wall has been selected for securing the television to. The systems and method described herein provide seamless transitions between wall- and table-mounted television configurations in an AR display of a scene as well as providing functionality to enable placement of the television on any wall or surface of the scene.

The description included herein provides several improvements over typical systems, including previous AR systems and visualization systems. In particular, the description herein enables visualization and placement of a digital object model without having to restart the AR session to change a configuration or select an alternative surface for interaction during the AR session. The GUI provides an improved user experience that is more flexible and intuitive for a user to interact with and provides an uninterrupted use of the system without the need to restart a session and interrupt the actions and interactions of the user.

FIG. 1 depicts an illustrative example of a system 100 that configures objects based on a placement location of a digital object in a scene in accordance with at least some embodiments. In FIG. 1, a user device 102 may be used to capture an image 104 of a scene, such as a room that includes a number of features such as walls 112, table 114, floor 116, and other furniture or objects. In accordance with at least some embodiments, the system may automatically (e.g., without user interaction) identify horizontal surfaces such as the floor 116 and the table 114 within the scene. When a digital object 110A-B is placed within the scene over a horizontal surface, the digital object 110A-B is configured based on the support needed to maintain the digital object 110A-B in the given position.

For clarity, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communication protocol.

When interacting with the system depicted in FIG. 1, a user may activate a mobile application installed upon, and executed from, a user device 102 and may subsequently scan an area that includes one or more objects. For example, upon activation of the mobile application or a function within the mobile application, the user device 102 may be caused to capture image and/or depth sensor output related to the scanned area using a camera and depth sensor of the user device 102. The mobile application may then cause the user device 102 to identify the one or more objects in the area using various object recognition techniques. In some embodiments, at least a portion of this processing may be performed upon the user device 102. In some embodiments, at least a portion of the processing may be performed by a mobile application server 104 in communication with the user device 102 and a database 106 over a network 108.

In accordance with at least some embodiments, once the floor 116, wall 112, and table 114 have been identified within the image information, the system may identify horizontal surfaces and relative or absolute heights thereof. The size, position, and heights of the horizontal surfaces may be determined using the camera of the user device 102, one or more depth sensing devices, object recognition techniques based on images from the camera, or any other known methods for detecting horizontal surfaces and objects in the scene.

In accordance with at least some embodiments, a user of, and/or an account associated with, the user device 102 may be identified. In some embodiments, the user/account may be identified based on a phone number or serial number associated with the user device 102. In some embodiments, the user may be asked to sign into an account upon execution of a mobile application on the user device 102, such that any actions performed using the mobile application may be automatically associated with the logged account and may be stored for later access.

Once the objects in the scene have been identified, the system may be further configured to automatically configure a digital object 110A-B based on the placement location of the digital object 110A-B relative to the horizontal surfaces of the scene. To do this, the system may first instruct a user to place the digital object 110A-B within the scene and may place an anchor associated with the digital object 110A-B within the scene as well. The anchor rests perpendicularly below the digital object 110A-B to define a horizontal position of the digital object 110A-B within the scene. The anchor may also be used to determine or adjust an angle of the digital object 110A-B.

In accordance with at least some embodiments, the system 100 may automatically configure the digital object 110A-B based on the position of the anchor within the scene. in a first example, the anchor may be positioned on the floor 116 of the scene. With the anchor positioned on the floor of the scene, the digital object 110A is shown on the user device 102 in a configuration to display a wall-mounted model of the digital object 110A. In a second example, the digital object 110B is positioned on the table 114. With the anchor positioned on the table 114, the digital object 110B is shown on the user device 102 in a configuration to display a horizontal surface-mounted model of the digital object 110B, such as with a stand underneath the digital object 110B.

Figure 2:
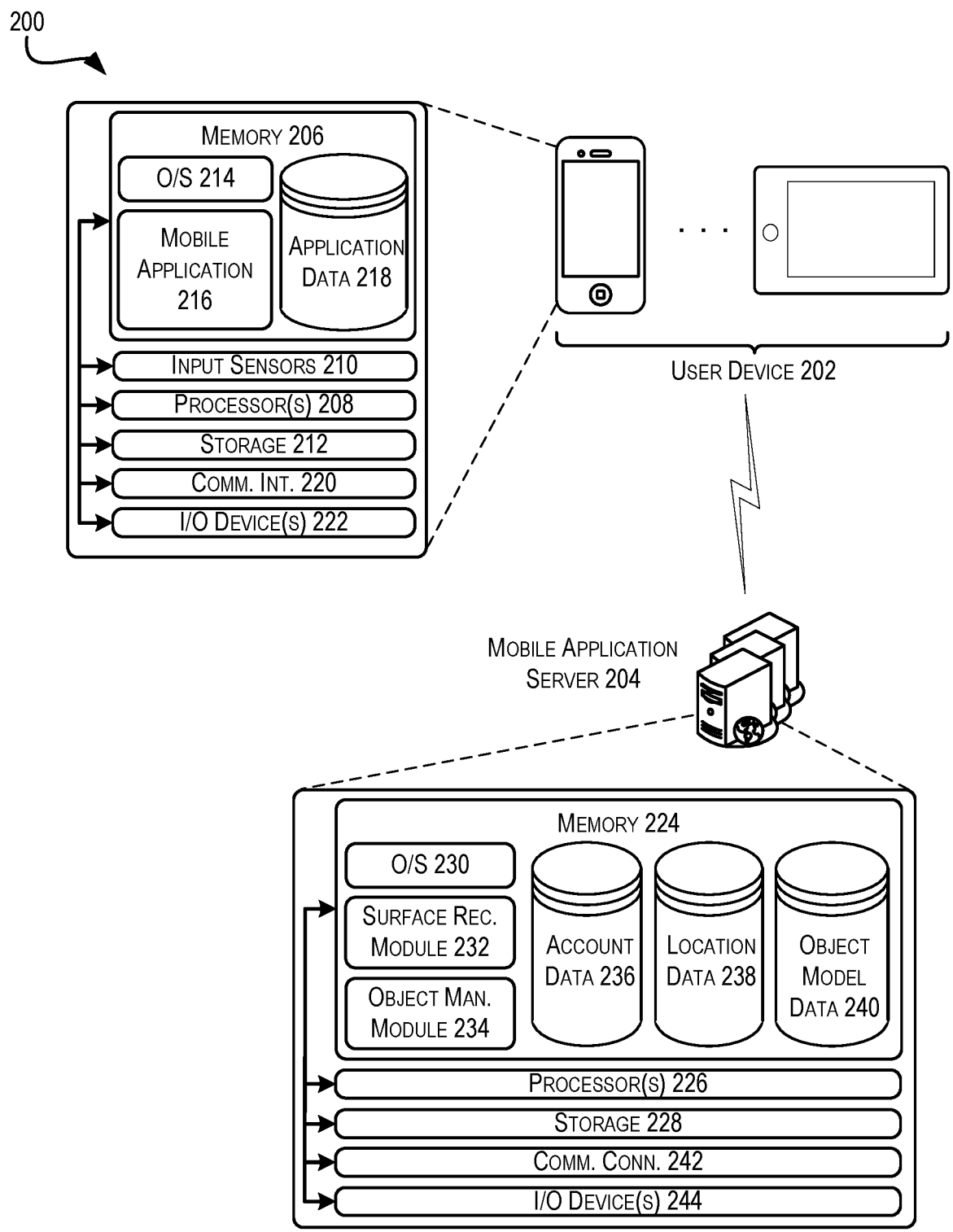
FIG. 2 depicts a system architecture for a system that configures objects based on a placement location of a digital object in a scene in accordance with at least some embodiments.

FIG. 2 depicts a system architecture for a system that configures objects based on a placement location of a digital object in a scene in accordance with at least some embodiments. In FIG. 2, a user device 202 may be in communication with a number of other components, including at least a mobile application server 204. The mobile application server 204 may perform at least a portion of the processing functions required by a mobile application installed upon the user device. The user device 202 may be an example of the user device 102 described with respect to FIG. 1.

A user device 202 may be any suitable electronic device that is capable of providing at least a portion of the capabilities described herein. In particular, the user device 202 may be any electronic device capable of capturing images of a scene and displaying information to a user. In some embodiments, a user device 202 may be capable of establishing a communication session with another electronic device (e.g., mobile application server 204) and transmitting/receiving data from that electronic device. A user device 202 may include the ability to download and/or execute mobile applications. User devices 202 may include mobile communication devices as well as personal computers and thin-client devices. In some embodiments, a user device may comprise any portable electronic device that has a primary function related to communication. For example, a user device may be a smart phone, a personal data assistant (PDA), or any other suitable handheld device. The user device 202 can be implemented as a self-contained unit with various components (e.g., input sensors, one or more processors, memory, etc.) integrated into the user device. Reference in this disclosure to an "output" of a component or an "output" of a sensor does not necessarily imply that the output is transmitted outside of the user device 202. Outputs of various components might remain inside a self-contained unit that defines a user device 202.

In one illustrative configuration, the user device 202 may include at least one memory 206 and one or more processing units (or processor(s)) 208. The processor(s) 208 may be implemented as appropriate in hardware, computer-executable instructions, firmware or combinations thereof. Computer-executable instruction or firmware implementations of the processor(s) 208 may include computer-executable or machine executable instructions written in any suitable programming language to perform the various functions described. The user device 202 may also include one or more input sensors 210 for receiving user and/or environmental input. There may be a variety of input sensors 210 capable of detecting user or environmental input, such as an accelerometer, a camera device, a depth sensor, a microphone, a global positioning system (e.g., GPS) receiver, etc. The one or more input sensors 210 may include at least a range camera device (e.g., a depth sensor) capable of generating a range image, as well as a camera device configured to capture image information.

For the purposes of this disclosure, a range camera (e.g., a depth sensor) may be any device configured to identify a distance, or range, of an object or objects from the range camera. In some embodiments, the range camera may generate a range image (or range map), in which pixel values correspond to the detected distance for that pixel. The pixel values can be obtained directly in physical units (e.g., meters). In at least some embodiments of the disclosure, the 3D imaging system may employ a range camera that operates using structured light. In a range camera that operates using structured light, a projector projects light onto an object or objects in a structured pattern. The light may be of a range that is outside of the visible range (e.g., infrared or ultraviolet). The range camera may be equipped with one or more camera devices configured to obtain an image of the object with the reflected pattern. Distance information may then be generated based on distortions in the detected pattern. It should be noted that although this disclosure focuses on the use of a range camera using structured light, any suitable type of range camera, including those that operate using stereo triangulation, sheet of light triangulation, time-of-flight, interferometry, coded aperture, or any other suitable technique for range detection, would be useable by the described system.

The memory 206 may store program instructions that are loadable and executable on the processor(s) 208, as well as data generated during the execution of these programs. Depending on the configuration and type of user device 202, the memory 206 may be volatile (such as random access memory (RAM)) and/or non-volatile (such as read-only memory (ROM), flash memory, etc.). The user device 202 may also include additional storage 212, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 206 may include multiple different types of memory, such as static random access memory (SRAM), dynamic random access memory (DRAM) or ROM. Turning to the contents of the memory 206 in more detail, the memory 206 may include an operating system 214 and one or more application programs or services for implementing the features disclosed herein including at least a mobile application 216. The memory 206 may also include application data 218, which provides information to be generated by and/or consumed by the mobile application 216. In some embodiments, the application data 218 may be stored in a database.

For the purposes of this disclosure, a mobile application may be any set of computer executable instructions installed upon, and executed from, a user device 202. Mobile applications may be installed on a user device by a manufacturer of the user device or by another entity. In some embodiments, the mobile application may cause a user device to establish a communication session with a mobile application server 204 that provides backend support for the mobile application. A mobile application server 204 may maintain account information associated with a particular user device and/or user. In some embodiments, a user may be required to log into a mobile application in order to access functionality provided by the mobile application 216.

In accordance with at least some embodiments, the mobile application 216 may be configured to provide an AR display of a scene, place digital objects within the display of the scene, and automatically configure the digital objects in accordance with the methods described herein. In accordance with at least some embodiments, the mobile application 216 may receive output from the input sensors 210 and identify objects or potential objects within that output. For example, the mobile application 216 may receive depth information (e.g., a range image) from a depth sensor (e.g., a range camera), such as the depth sensors previously described with respect to input sensors 210. Based on this information, the mobile application 216 may determine various horizontal surfaces and relative positions of the different horizontal surfaces with respect to one another as well as with respect to the user device 202. For example, a sudden variance in depth within the depth information may indicate a border or outline of a surface. In another example, the mobile application 216 may utilize one or more machine vision techniques to identify the bounds of a surface. In this example, the mobile application 216 may receive image information from a camera input sensor 210 and may identify surfaces within the image information based on variances in color or texture data detected within the image. In some embodiments, the mobile application 216 may cause the user device 202 to transmit the output obtained from the input sensors 210 to the mobile application server 204, which may then perform one or more object recognition techniques upon that output. Additionally, the mobile application 216 may cause the user device 202 to transmit a current location of the user device 202 as well as an orientation (e.g., facing) of the user device 202 to the mobile application server 204.

The user device 202 may also contain communications interface(s) 220 that enable the user device 202 to communicate with any other suitable electronic devices. In some embodiments, the communication interface 220 may enable the user device 202 to communicate with other electronic devices on a network (e.g., on a private network). For example, the user device 202 may include a Bluetooth wireless communication module, which allows it to communicate with another electronic device (e.g., a Bluetooth laser measuring tape, etc.). The user device 202 may also include input/output (I/O) device(s) and/or ports 222, such as for enabling connection with a keyboard, a mouse, a pen, a voice input device, a touch input device, a display, speakers, a printer, etc.

In some embodiments, the user device 202 may communicate with the mobile application server 204 via a communication network. The communication network may include any one or a combination of many different types of networks, such as cable networks, the Internet, wireless networks, cellular networks, and other private and/or public networks. In addition, the communication network may comprise multiple different networks. For example, the user device 202 may utilize a wireless local area network (WLAN) to communicate with a wireless router, which may then route the communication over a public network (e.g., the Internet) to the mobile application server 204.

The mobile application server 204 may be any computing device or plurality of computing devices configured to perform one or more calculations on behalf of the mobile application 216 on the user device 202. In some embodiments, the mobile application 216 may be in periodic communication with the mobile application server 204. For example, the mobile application 216 may receive updates, push notifications, or other instructions from the mobile application server 204. In some embodiments, the mobile application 216 and mobile application server 204 may utilize a proprietary encryption and/or decryption scheme to secure communications between the two. In some embodiments, the mobile application server 204 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the mobile application server 204 may include at least one memory 224 and one or more processing units (or processor(s)) 226. The processor(s) 226 may be implemented as appropriate in hardware, computer-executable instructions, firmware or combinations thereof. Computer-executable instruction or firmware implementations of the processor(s) 226 may include computer-executable or machine executable instructions written in any suitable programming language to perform the various functions described.

The memory 224 may store program instructions that are loadable and executable on the processor(s) 226, as well as data generated during the execution of these programs. Depending on the configuration and type of mobile application server 204, the memory 224 may be volatile (such as random access memory (RAM)) and/or non-volatile (such as read-only memory (ROM), flash memory, etc.). The mobile application server 204 may also include additional storage 228, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 224 may include multiple different types of memory, such as static random access memory (SRAM), dynamic random access memory (DRAM) or ROM. Turning to the contents of the memory 224 in more detail, the memory 224 may include an operating system 230 and one or more application programs or services for implementing the features disclosed herein including at least a module for detecting horizontal surfaces within the scene (surface recognition module 232) and/or a module for managing object data (object management module 234). The memory 224 may also include account data 236, which provides information associated with user accounts maintained by the described system, location data 238, which provides information related to object and surface locations as well as layout information, and/or object model database 240, which provides information on a number of objects including different configurations of objects for placement as digital objects in the AR display. In some embodiments, one or more of the account data 236, the location data 238, or the object model database 240 may be stored in a database. In some embodiments, the object model database 240 may be an electronic catalog that includes data related to objects available from a resource provider, such as a retailer or other suitable merchant.

The memory 224 and the additional storage 228, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, the term "modules" may refer to programming modules executed by computing systems (e.g., processors) that are installed on and/or executed from the mobile application server 204. The mobile application server 204 may also contain communications connection(s) 242 that allow the mobile application server 204 to communicate with a stored database, another computing device or server, user terminals, and/or other components of the described system. The mobile application server 204 may also include input/output (I/O) device(s) and/or ports 244, such as for enabling connection with a keyboard, a mouse, a pen, a voice input device, a touch input device, a display, speakers, a printer, etc.

Turning to the contents of the memory 224 in more detail, the memory 224 may include the surface recognition module 232, the object management module 234, the database containing account data 236, the database containing location data 238, and/or the database containing object model data 240.

In some embodiments, the object surface module 232 may be configured to, in conjunction with the processors 226, receive input sensor data from the user device 202 and identify one or more surfaces within the input sensor data. As described above, the system may use any suitable object recognition technique or surface recognition technique to identify the objects and/or surfaces within the input sensor data. In some embodiments, the surface recognition module 232 may use one or more machine learning techniques to map at least a portion of the received input sensor data to data stored in the location data database 238. For example, the surface recognition module 232 may gather point cloud data obtained via the input sensors 210 (or other information derived from such point cloud data) to identify sizes and locations of surfaces that may then be stored in the location database 238. In some embodiments the object model database 240 is maintained by a resource provider (e.g., a merchant or other retailer), the object model database 240 may include object entries even for objects which are provided by the resource provider as well as different configurations of the objects. For example, the object model database 240 may include an entry for a television with a wall-mounted bracket as well as an entry for the same television with a surface supported stand. Based on a location of an anchor of the object (as placed and positioned by the user) a corresponding object model may be selected from the object model database 240 for display in the AR scene on the user device 202.

In some embodiments, each of the object entries within the object model database 240 may be associated with a three-dimensional (3D) model of that object. In these embodiments, the 3D model may be provided to the mobile application 216 such that the user device 202 is caused to display the 3D model on a display of the user device in a way that the object associated with the 3D model is depicted as appearing in the location stored in association with the object. In some embodiments, image extrapolation or other techniques may be used to remove the information related to the object from the depicted image so that the depicted 3D model replaces the input sensor output related to the object within the image. For example, the mobile application 216 may use augmented reality to depict an image of the 3D model over an image of an actual scene captured using a user device 202 while the actual image of that object is hidden within the scene (e.g., using image extrapolation). The mobile application 216 may enable a user of the user device 202 to move or otherwise reposition the 3D model of the object in order to see how the object would appear in a new position. In accordance with at least some embodiments, 3D models may be identified based on a position within the depicted image, such as on a wall versus on a tabletop. The 3D models may then be depicted over each of the objects within the captured image information so that they might appear to be moved or altered without actually physically moving the real object depicted in the image.

Figure 3:
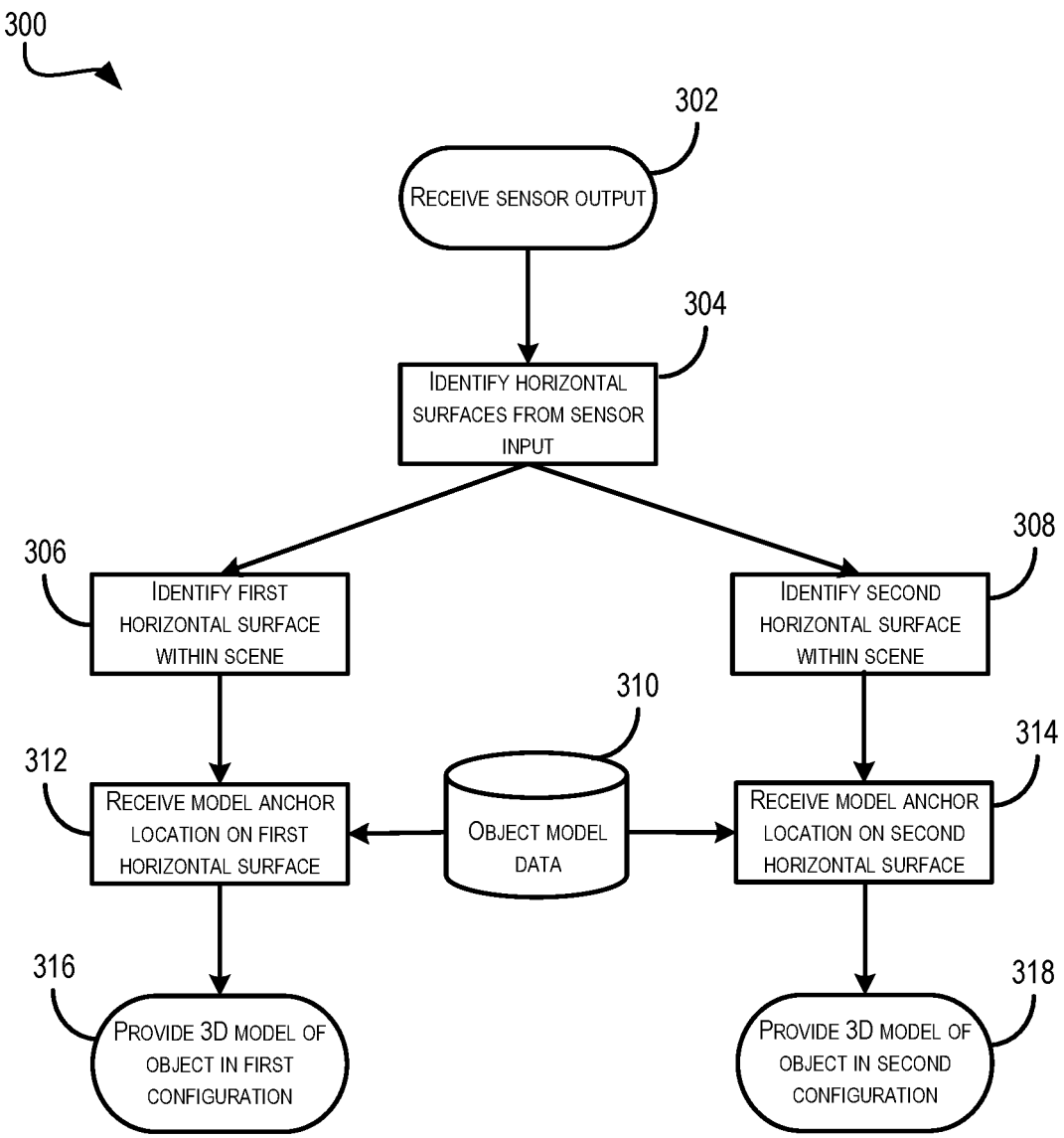
FIG. 3 depicts a flow chart illustrating a process for automatically configuring digital objects based on object locations in accordance with at least some embodiments.

FIG. 3 depicts a flow chart illustrating a process 300 for automatically configuring digital objects based on object locations in accordance with at least some embodiments. Some or all of the process 300 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. Process 300 may be performed by an example user device 202, a mobile application server 204, and various other components, each of which is depicted with respect to FIG. 2.

Process 300 may begin at 302, when the system receives sensor output obtained from a user device. As described elsewhere, the sensor output may include image information as well as depth sensor output. In some embodiments, the sensor output may be received as a stream of data. For example, the input sensor data may be received as a video stream. In some embodiments, at least a portion of the process 300 described herein may be performed at a user device. For example, objects may be identified within sensor output by the user device. In some embodiments, process 300 may be performed entirely by a mobile application server in communication with a user device (e.g., mobile application server 204 of FIG. 2). The sensor output may include multiple outputs from multiple types of sensors. For example, in some embodiments, the sensor output may include both image information captured by a camera device as well as a depth map captured using a depth sensor.

At 304, the process includes identifying horizontal surfaces within a scene based on the sensor output received at 302. The horizontal surfaces may be identified by any known means, including those described herein. In some examples, the horizontal surfaces may be identified by object recognition techniques, using depth sensor data, raycasting techniques, and any other suitable techniques.

At 306 and 308, a first and a second horizontal surface are identified within the scene. The first horizontal surface may be a floor of the scene while a second horizontal surface may be any other horizontal surface within the scene. The second horizontal surface may be identified by first detecting a horizontal surface and subsequently determining that the horizontal surface is offset from the floor or the first horizontal surface by at least a predetermined threshold. For example, in some cases horizontal surfaces that fall within a height range of several inches of one another may be considered as a single horizontal surface. In some examples, the floor may be detected through a heuristic used to detect horizontal planes. The heuristic may include initially identifying multiple horizontal planes in a space and identifying the largest of the identified horizontal planes. Next, the lowest, with respect to height within the space, horizontal plane within a percentage of the largest horizontal area may be identified, for example by identifying surfaces that include at least a particular threshold percentage of the largest horizontal surface. A bounding area may be established using predetermined heights above and below the lowest plane previously selected, for example to select planes within several inches of height to each other. The bounding area, and planes selected thereby may be established as the floor. In some examples, at 306, the lowest surface or bottommost surface within a scene may be determined to be a floor, with every other surface positioned higher than the floor.

At 312, the process 300 includes receiving a model anchor location on the first horizontal surface. The model anchor location may initially be determined by raycasting from the user device 202 to place the anchor in a location within the scene at a central gaze location of the user on the user device 202. The model anchor is positioned on a surface intersected by a ray originating from the user device 202.

In an instance where the ray intersects the first horizontal surface, object model data 310 may be received from a database useful for providing a 3D model of the object in a first configuration at 316. For example, the object model data 310 may include object model database 240 and different configurations of various objects that can be placed within the AR display of the scene. When the anchor is positioned on the first horizontal surface, such as a floor of the scene, the object is shown in a first configuration. In some examples, the first configuration may be a wall-mounted configuration of an object, such as a television. The process 300 may further enable rotation of the anchor to pivot the plane of the object as well as adjust a vertical position of the object.

In an instance where the ray intersects the second horizontal surface, object model data 310 may be received from a database useful for providing a 3D model of the object in a second configuration at 318. For example, the object model data 310 may include object model database 240 and different configurations of various objects that can be placed within the AR display of the scene. When the anchor is positioned on the second horizontal surface, such as a tabletop, the object is shown in a second configuration. In some examples, the second configuration may be a surface-mounted configuration of the object, such as a television. The process 300 may further enable rotation of the anchor to pivot the plane of the object but does not allow vertical positioning of the object, as the surface-mounted stand of the object resting on the second horizontal surface determines the vertical position of the object.

FIGS. 4-10 depict an illustrative example of a user interaction that may occur during placement of a digital object in an augmented reality system in accordance with at least some embodiments. The illustrative example is displayed through a series of displays or scenes as depicted on a display of a user device, such as user device 202. Additional or fewer interactions than depicted may occur during a user interaction with a system as described herein. Features or elements depicted within FIGS. 4-11 may share similar identifying numerals to indicate similar or identical objects, for example with television 720 and television 820 illustrating the digital model of the television.

Figure 4:
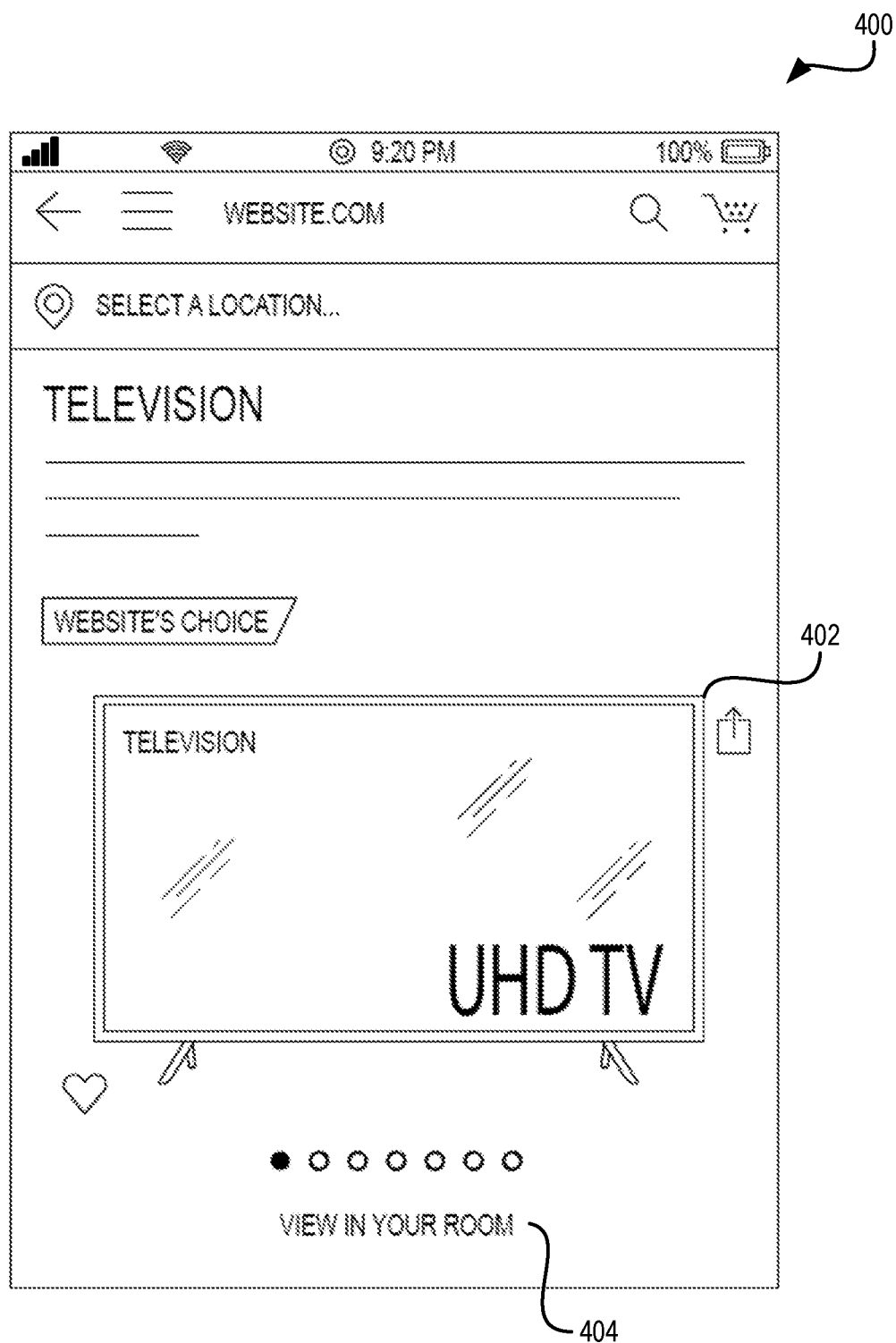
FIG. 4 depicts a first scene of an illustrative example of a user interaction that may occur during placement of a digital object in an augmented reality system in accordance with at least some embodiments.

FIG. 4 depicts a first scene 400 of an illustrative example of a user interaction that may occur during placement of a digital object in an augmented reality system in accordance with at least some embodiments. The first scene displays an example of a display of user device 202 while a user is browsing an online catalog of a resource provider, such as an online retailer. The online catalog includes a listing for a television 402 that a user may be interested in. An option 404 at the bottom of the display provides the user with the ability to visualize the television 402 in their room or any space they desire. The user can select the option 404 to enter an AR display system using a camera of the user device and enabling placement of the television 402 in the room in the AR display to visualize the room with the television in one or more locations.

Figure 5:
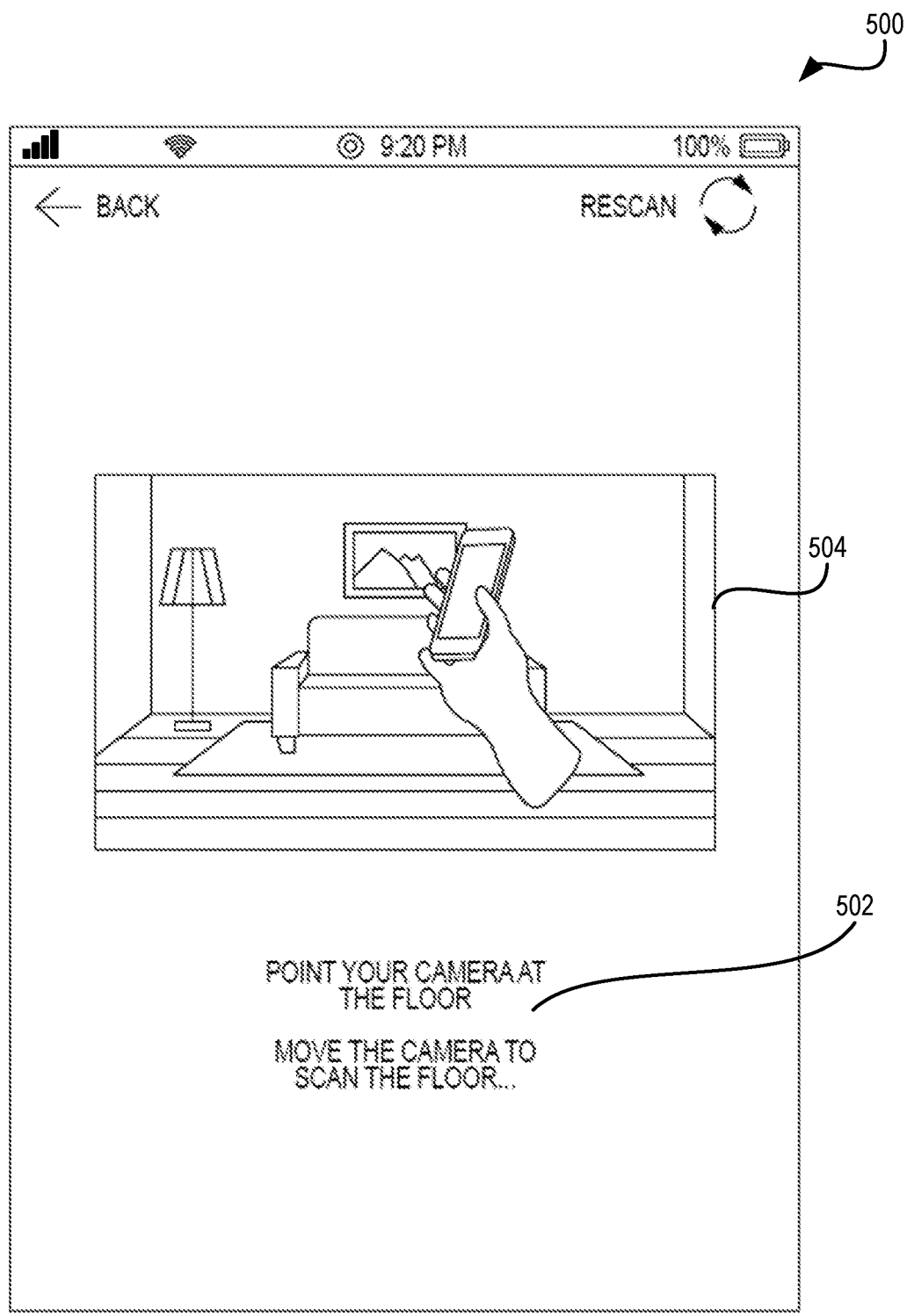
FIG. 5 depicts a second scene of the illustrative example of a user interaction that may occur during placement of a digital object in an augmented reality system in accordance with at least some embodiments.

FIG. 5 depicts a second scene 500 of the illustrative example of a user interaction that may occur during placement of a digital object in an augmented reality system in accordance with at least some embodiments. The second scene includes an instruction 502 that instructs the user to aim a camera of the user device at the floor of the room and to scan the floor. An image 504 is provided to illustrate the instruction to the user. During the user scanning the floor of the room, the floor is detected and determined to be a first horizontal surface that is the floor of the room. During this interaction, additional horizontal surfaces within the room can be detected, such as countertops, tabletops, shelves, and other such surfaces. The system may, as described above, identify additional horizontal surfaces as distinct from the floor if a vertical distance between the floor and the subsequent horizontal surfaces exceeds a predetermined threshold.

Figure 6:
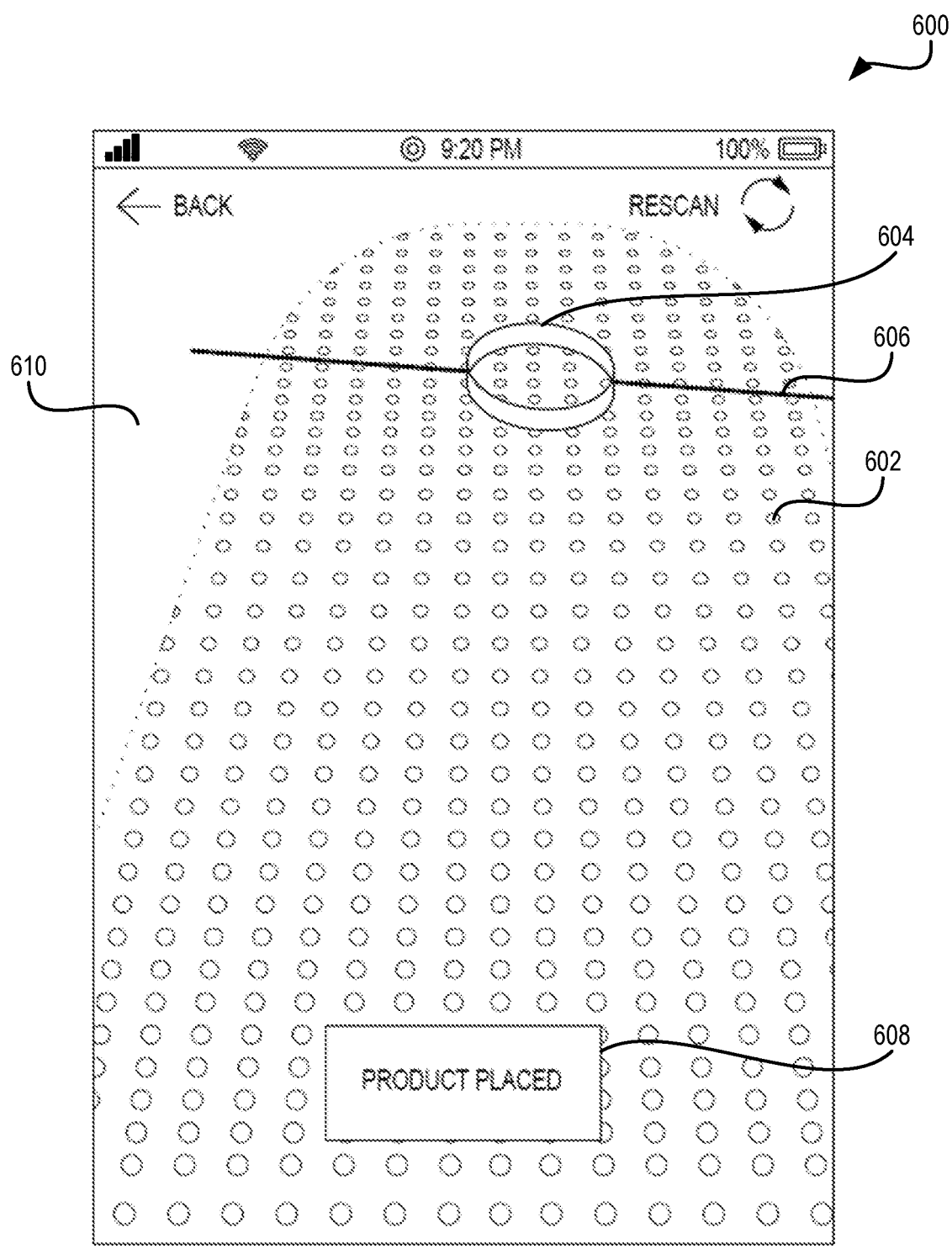
FIG. 6 depicts a third scene of the illustrative example of a user interaction that may occur during placement of a digital object in an augmented reality system in accordance with at least some embodiments.

FIG. 6 depicts a third scene 600 of the illustrative example of a user interaction that may occur during placement of a digital object in an augmented reality system in accordance with at least some embodiments. In the third scene 600, image data from the camera is displayed on the user device with additional objects displayed in an AR display of the space. In particular, in the third scene 600, the floor 610 is shown with a projected grid 602 thereon as well as an anchor 604 and alignment bar 606. An indication 608 at the bottom of the display informs the user that the product has been placed within the display. The projected grid 602 displays an array of dots to guide the view of the user towards the anchor 604, which determined the position of the object within the scene (with respect to an x-y position). For example, in an initial placement, the anchor may be placed within the scene at a set distance from the user device, for example at around two meters away, in the direction of the camera of the user device. The digital model may be placed within the scene directly above, e.g., in a direction perpendicular to the floor, the anchor, at a predetermined height. In some examples, the predetermined height may include the height of the user device held by the user. In some examples, the predetermined height may include the height of a camera or other optical sensor of the user device. The alignment bar 606 is useful for rotating the object, for example to align the model of the object with a surface of a wall.

Figure 7:
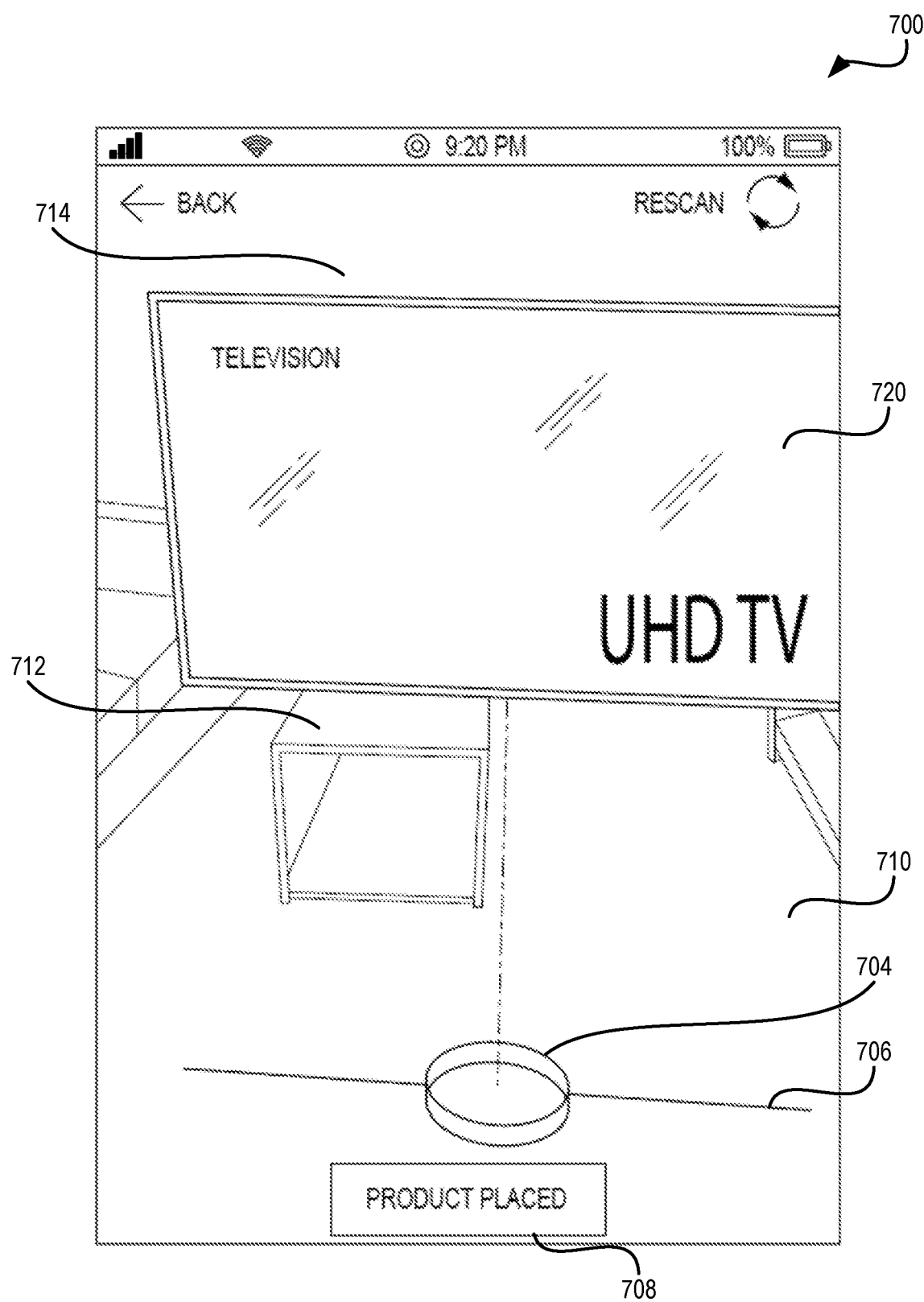
FIG. 7 depicts a fourth scene of the illustrative example of a user interaction that may occur during placement of a digital object in an augmented reality system in accordance with at least some embodiments.

FIG. 7 depicts a fourth scene 700 of the illustrative example of a user interaction that may occur during placement of a digital object in an augmented reality system in accordance with at least some embodiments. In the fourth scene 700, the anchor 704 and alignment bar 706 are shown projected onto the floor 710 with the television 720 shown directly above the anchor 704. Within the fourth scene 700 there is a tabletop 712 as well as a wall 714 which the user may be interested in positioning the television 720 relative to, for visualizing the room after purchase of the television 720. The anchor 704 may be moved to change the x-y position of the television within the room. Additional notes 708 are shown at the bottom of the scene 700, for example to indicated placement of the television 720 within the scene 700.

Figure 8:
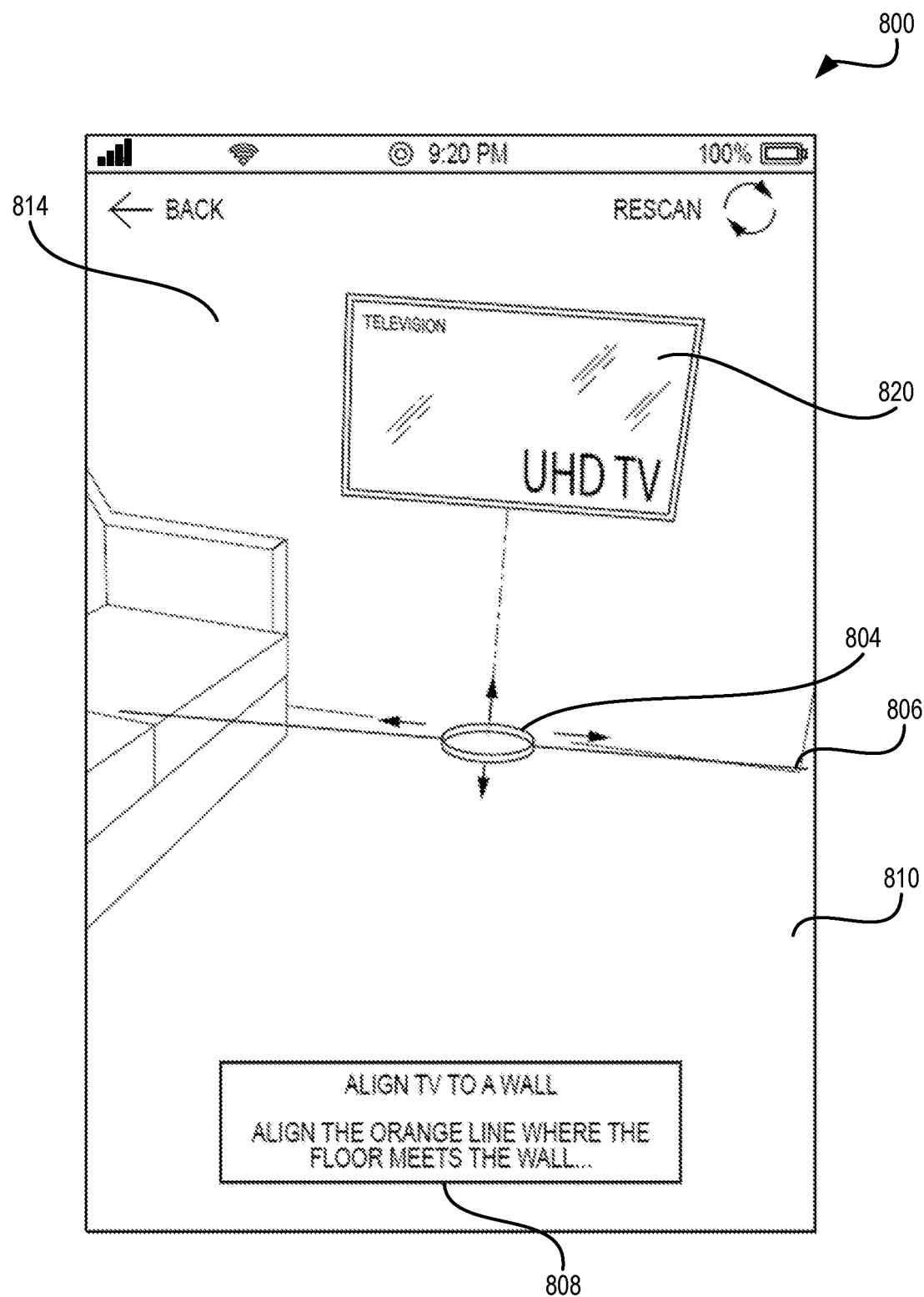
FIG. 8 depicts a fifth scene of the illustrative example of a user interaction that may occur during placement of a digital object in an augmented reality system in accordance with at least some embodiments.

FIG. 8 depicts a fifth scene 800 of the illustrative example of a user interaction that may occur during placement of a digital object in an augmented reality system in accordance with at least some embodiments. The fifth scene 800 includes some of the same elements as the fourth scene 700, including the anchor 804, alignment bar 806, floor 810, wall 814, television 820, and notes 808. As illustrated in FIG. 8, the anchor 804 is in the process of being moved by the user to the base of wall 814, to position the television 820 on the wall 814. During moving of the anchor 804, the television 820 may remain in a single configuration, i.e., wall-mounted. Once the user completes moving the anchor 804, the intersection of a ray from the user device 202 directed towards the anchor 804 intersects a horizontal surface. When the ray intersects the floor 810, the television 820 may be displayed in the wall-mounted configuration. When the ray intersects a tabletop (not shown in FIG. 8), the television 820 may be shown in a surface-supported configuration with a television stand, similar to object 110B of FIG. 1. In addition to placing the anchor 804, the user can adjust the alignment bar 806 to change the orientation of the television 820 within the space, for example to align the television 820 flat against the wall 814 or to orient the television 820 in a particular direction on the tabletop. In some examples, the walls 814 of the room may be detected using the camera of the user device 202 and the anchor 804 can be automatically snapped or moved to the base of the wall 814 such that the user need not manually position the anchor 804 each time. When the anchor 804 is positioned on the floor 810, the system automatically assumes the television 820 will be in the wall-mounted configuration. In some examples, the default configuration when the anchor 804 is positioned on the wall may be surface-mounted or otherwise configured by default.

The user may be able to change the default setting for the television 820 through settings of the user device 202 and mobile application thereon.

Figure 9:
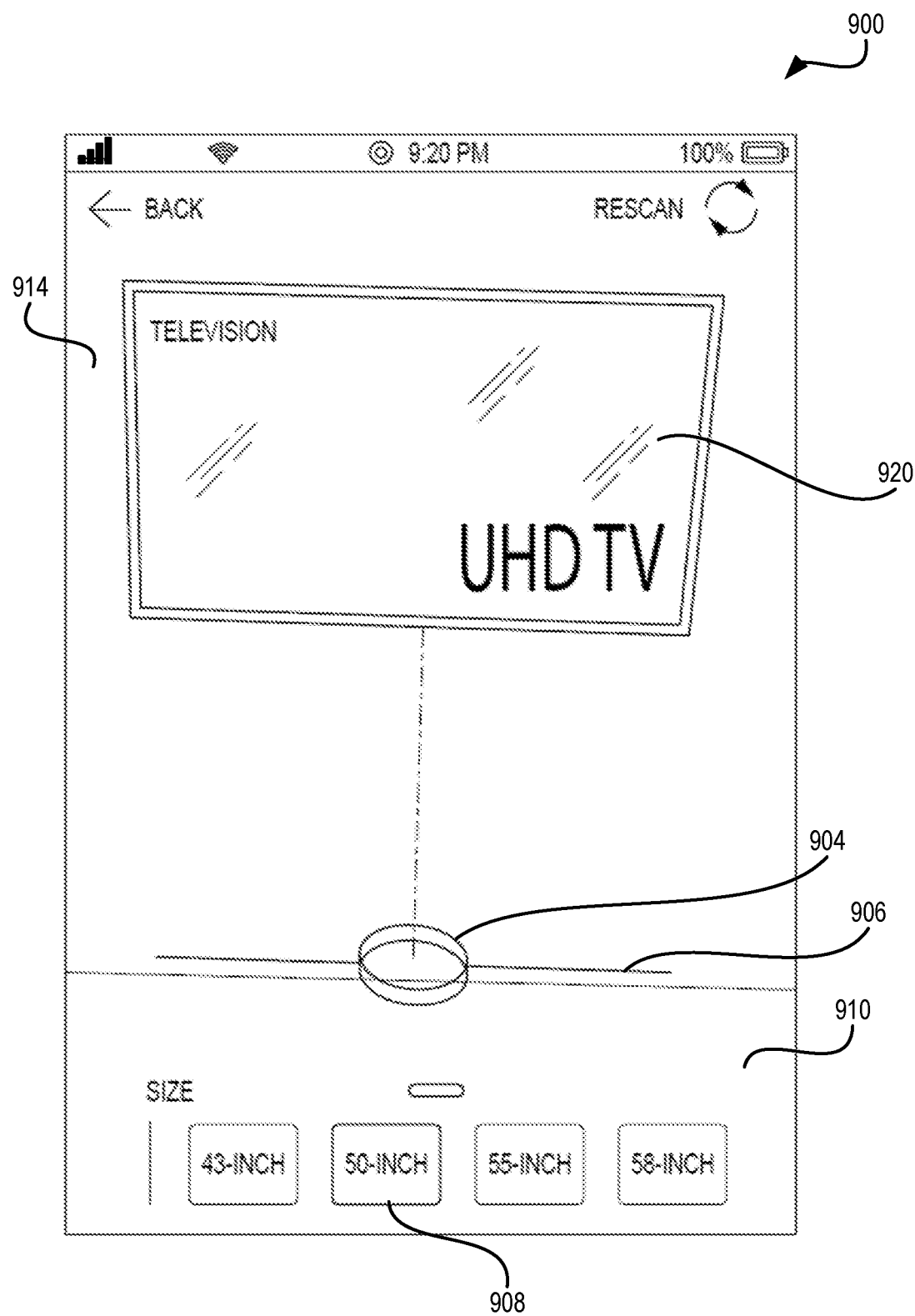
FIG. 9 depicts a sixth scene of the illustrative example of a user interaction that may occur during placement of a digital object in an augmented reality system in accordance with at least some embodiments.

FIG. 9 depicts a sixth scene 900 of the illustrative example of a user interaction that may occur during placement of a digital object in an augmented reality system in accordance with at least some embodiments. In the sixth scene 900, the anchor 904 is placed at the base of wall 914 with alignment bar 906 aligned with the plane of the wall 914. The television 920 is in a plane parallel to the plane of the wall 914. As depicted, the television 920 may be changed between different sizes or configurations of the television 920 by selecting different options 908, such as to change to different sizes, shapes, colors, or other such versions of the television 920 available from the resource provider. This enables the user to visualize different sizes, shapes, and configurations, as well as many different placements of the television 920 within the room.

Figure 10:
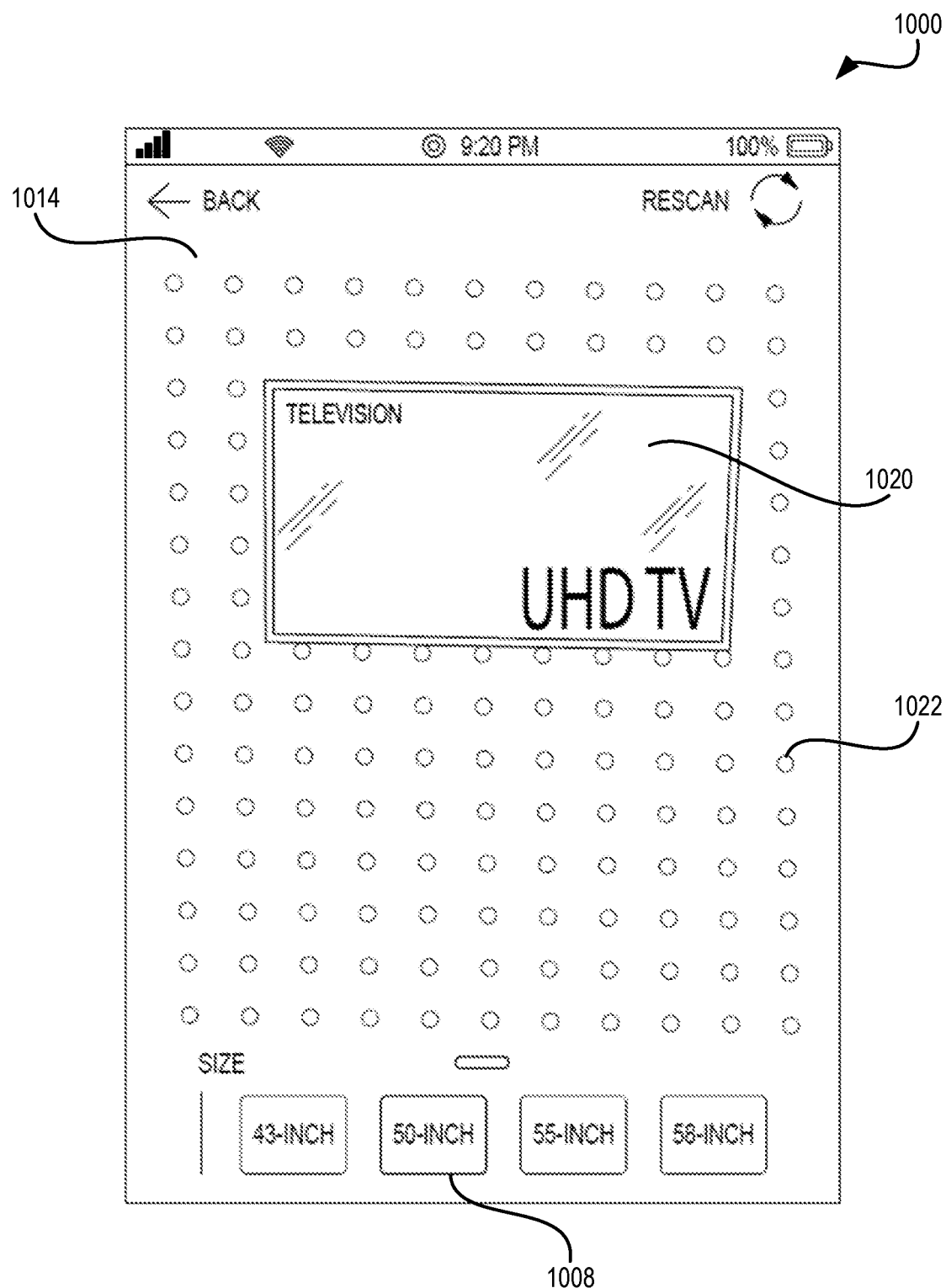
FIG. 10 depicts a seventh scene of the illustrative example of a user interaction that may occur during placement of a digital object in an augmented reality system in accordance with at least some embodiments.

FIG. 10 depicts a seventh scene 1000 of the illustrative example of a user interaction that may occur during placement of a digital object in an augmented reality system in accordance with at least some embodiments. In the seventh scene 1000, the user may have placed the television 1020 on the wall 1014 previously, such as in scene 900. The television 1020 can be positioned using a projected grid 1022 displayed on the wall to aid the user in placing the television at an appropriate height, such as even or level with other objects in the room. The user additionally has the options 1008 to change the size or configuration of television 1020 to illustrate different options.

Figure 11:
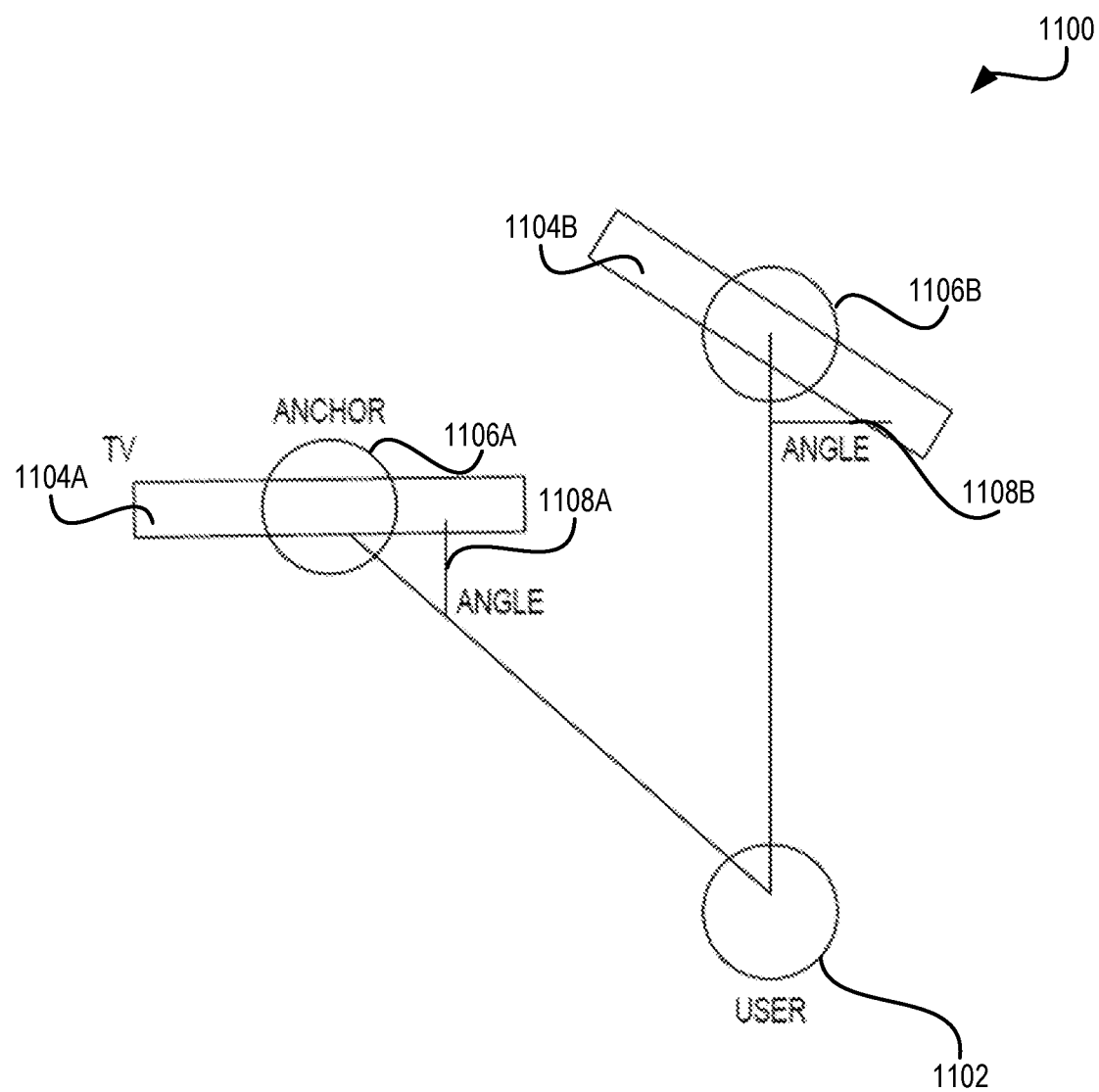
FIG. 11 depicts an illustrative example of maintaining a relative angle of a digital object during movement of the digital object in accordance with at least some embodiments.

FIG. 11 depicts an illustrative example 1100 of maintaining a relative angle of a digital object during movement of the digital object in accordance with at least some embodiments. In some embodiments, as the user moves the digital object within the space by moving anchor 1106A, or by moving anchor 604 on the display of the user device 202, the angle 1108A of the television 1104A with respect to the user 1102 may be maintained as constant such that the user 1102 need not reposition the angle 1108A after adjusting the position of the anchor 1106B. In some examples, the angle 1108A-B may be maintained as the anchor 1106A-B is moved to ensure the television 1104A-B is facing the same direction within the room as set by the user previously. For example, once the television 1104A-B is positioned and oriented, for example on a wall, the user may wish to see the television 1104A-B positioned on a table facing the same direction but at a different position within the room. Typical systems would require the user to adjust both the position and the angle of the television 1104A-B in multiple steps to accomplish this visualization. In the system described herein, the television can be moved easily from a wall to a horizontal surface and vice versa without also needing to manually adjust the angle of the television 1104A-B.

Figure 12:
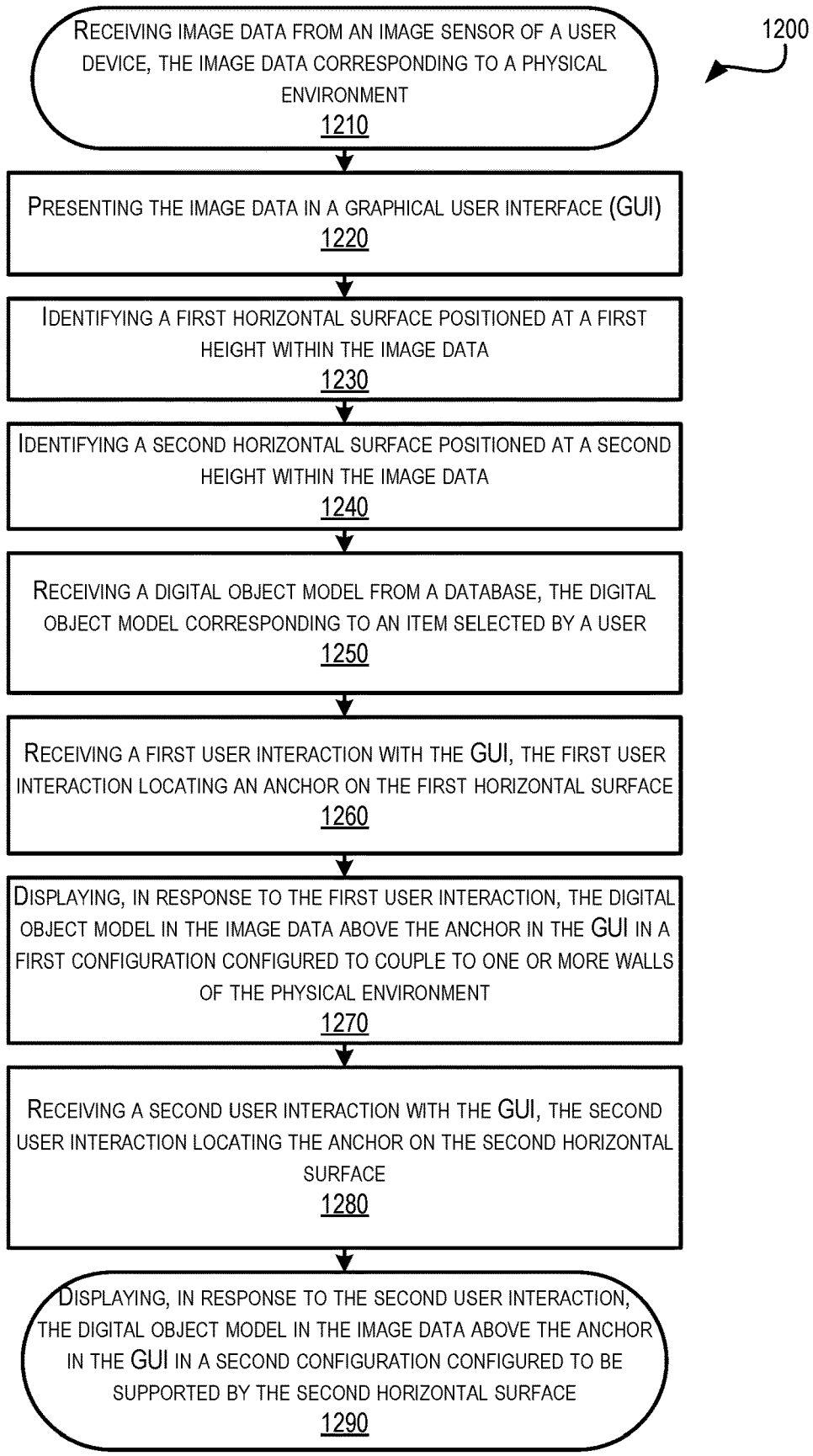

FIG. 12 depicts a flow diagram illustrating a process 1200 for automatically configuring a digital object based on the object placement location in accordance with at least some embodiments. Some or all of the process 1200 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

At 1210, the process 1200 includes receiving image data from an image sensor of a user device, the image data corresponding to a physical environment. The image sensor may be a camera of the user device 202. In some examples, the image data may include still images or may include a stream of images in video data. The physical environment corresponds to a physical environment where the user is positioned, such as a room where the user is standing with their user device 202.

At 1220, the process 1200 includes presenting the image data in a graphical user interface (GUI). The GUI may be displayed on a display of the user device 202.

At 1230, the process 1200 includes identifying a first horizontal surface positioned at a first height within the image data. The first horizontal surface is identified based on any known object or surface recognition techniques, including those described herein. The first horizontal surface may be identified based on the image data. In some examples, the first horizontal surface may also be identified based on depth sensor data or other such depth data gathered by a sensor of the user device 202. The first horizontal surface is at a first height, and may be set as a floor, with a height of zero in some instances. In some examples, an absolute height, based on depth and altitude data may be determined.

At 1240, the process 1200 includes identifying a second horizontal surface positioned at a second height within the image data. The second horizontal surface is identified based on any known object or surface recognition techniques, including those described herein. The second horizontal surface may be identified based on the image data. In some examples, the second horizontal surface may also be identified based on depth sensor data or other such depth data gathered by a sensor of the user device 202. The second horizontal surface is at a second height, which is different from the first height, and is positioned at a height above the floor. The second horizontal surface may be differentiated from the first horizontal surface through the use of depth sensor data. In some examples, the height of the second horizontal surface may be greater than a predetermined threshold, such as three or more inches, in order to differentiate the first horizontal surface from the second horizontal surface.

At 1250, the process 1200 includes receiving a digital object model from a database, the digital object model corresponding to an item selected by a user. The digital object model corresponds to an item selected by a user from a resource provider. The digital object model has a first configuration and a second configuration, the first configuration and second configuration different with respect to how the digital object model is mounted or supported by a surface. In an example, the first configuration may be wall-mounted while the second configuration is mounted or standing self-supported on a horizontal surface.

At 1260, the process 1200 includes receiving a first user interaction with the GUI, the first user interaction locating an anchor on the first horizontal surface. The first user interaction may include a user input onto the user device 202. The user interaction may include selecting a location, centering a location of the image data within the GUI, or otherwise indicating a location for the anchor.

At 1270, the process 1200 includes displaying, in response to the first user interaction, the digital object model in the image data above the anchor in the GUI in a first configuration configured to couple to one or more walls of the physical environment. In some examples, at 1270, the process includes displaying, within the image data in the GUI and in response to the first user interaction, the digital television model in a first configuration in which the digital television model is (i) positioned over the anchor located on the floor surface and (ii) in a wall-mounted configuration. The anchor may determine an x-y position of the digital object model within the image data. The digital object model is positioned vertically above the anchor, perpendicular to the horizontal surface and elevated above the horizontal surface. When the anchor of the digital object is positioned on the first horizontal surface, for example as determined by raycasting from the user device 202, the digital object model may be in the first configuration, which may be a wall-mounted configuration when the first horizontal surface is a floor of the physical environment.

At 1280, the process 1200 includes receiving a second user interaction with the GUI, the second user interaction placing an anchor of the digital object model on the second horizontal surface. In some examples, at 1280, the process 1200 includes receiving a second user interaction with the GUI, the second user interaction locating the anchor on the horizontal surface. The second user interaction may include a user input onto the user device 202. The user interaction may include selecting a location, centering a location of the image data within the GUI, or otherwise indicating a location for the anchor.

At 1290, the process 1200 includes displaying, in response to the second user interaction, the digital object model in the image data above the anchor in the GUI in a second configuration configured to be supported by the second horizontal surface. In some examples, at 1290, the process 1200 includes displaying, within the image data in the GUI and in response to the second user interaction, the digital television model in a second configuration in which the digital television model is (i) positioned over the anchor located on the horizontal surface and (ii) in a stand-supported configuration. The anchor may determine an x-y position of the digital object model within the image data. The digital object model is positioned vertically above the anchor, perpendicular to the horizontal surface and elevated above the second horizontal surface. When the anchor of the digital object is positioned on the second horizontal surface, for example as determined by raycasting from the user device 202, the digital object model may be in the second configuration, which may be a self-supporting configuration or a surface-mounted configuration when the second horizontal surface is a surface other than the floor of the physical environment.

Figure 13:
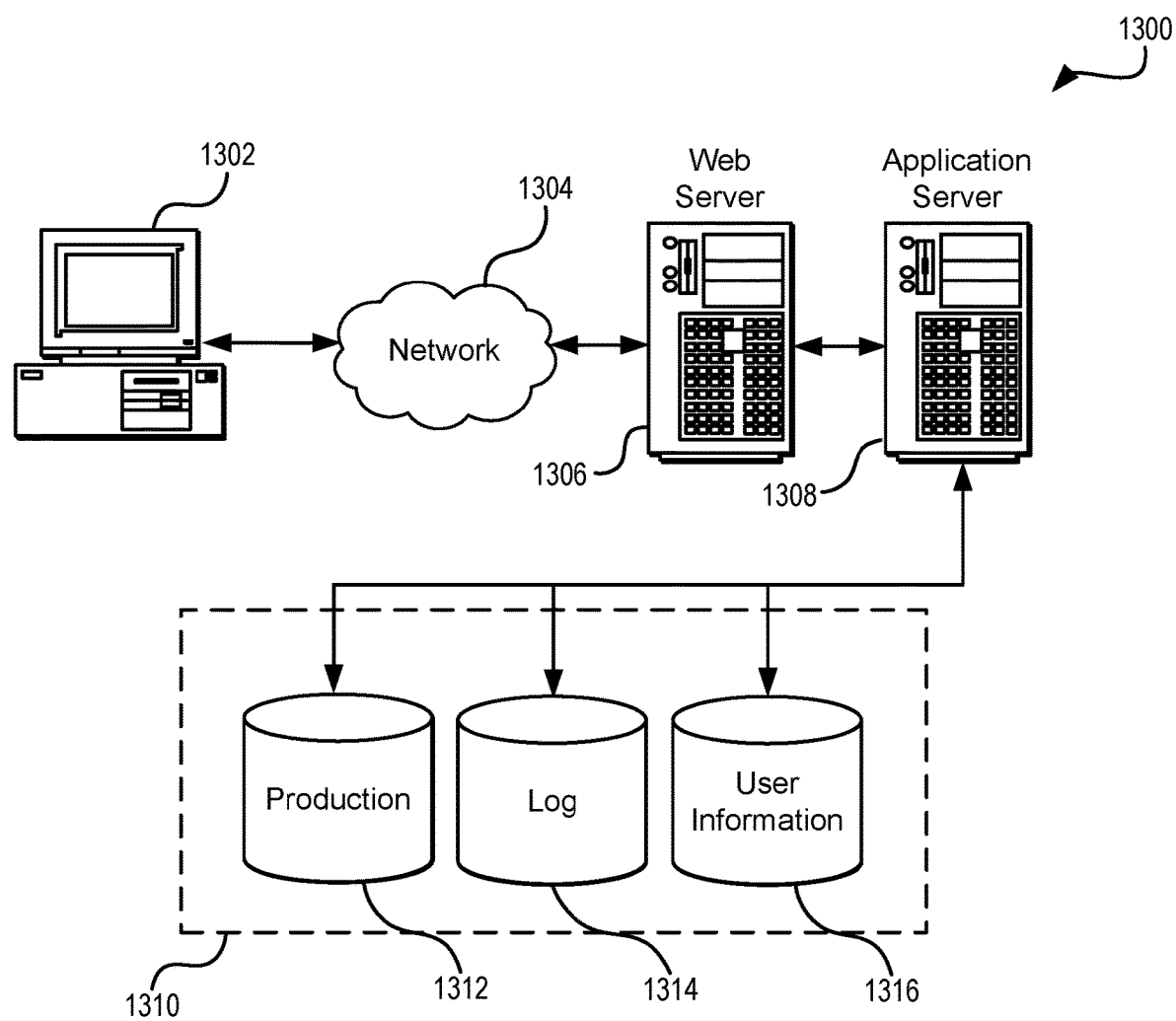

FIG. 13 illustrates aspects of an example environment 1300 for implementing aspects in accordance with various embodiments. As will be appreciated, although a Web-based environment is used for purposes of explanation, different environments may be used, as appropriate, to implement various embodiments. The environment includes an electronic client device 1302, which can include any appropriate device operable to send and receive requests, messages, or information over an appropriate network 1304 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is capable of generating content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1302 and the application server 1308, can be handled by the Web server. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing production data 1312 and user information 1316, which can be used to serve content for the production side. The data store also is shown to include a mechanism for storing log data 1314, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1302. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
   one or more processors; and
   one or more non-transitory computer-readable media having instructions stored thereon that, when executed by the one or more processors, cause the one or more processors to:
   receive image data from an image sensor, the image data corresponding to a physical environment;
   present the image data in a graphical user interface (GUI) of a user device;
   identify a floor surface positioned at a first height within the image data;
   identify a horizontal surface positioned at a second height within the image data, the horizontal surface identified as being different from the floor surface based at least in part on determining that the second height is greater than the first height;
   receive a digital television model from a database, the digital television model corresponding to a television selected by a user via the GUI;
   receive a first user interaction with the GUI, the first user interaction locating an anchor on the floor surface based at least in part on determining a first intersection between a first ray, originating from the user device, and the floor surface;
   display, within the image data in the GUI and in response to the first user interaction, the digital television model in a first configuration in which the digital television model is (i) positioned over the anchor located on the floor surface and (ii) in a wall-mounted configuration based at least in part on determining that the anchor is located on the floor surface;
   receive a second user interaction with the GUI, the second user interaction relocating the anchor from the floor surface to the horizontal surface based at least in part on determining a second intersection between a second ray, originating from the user device, and the horizontal surface; and
   display, within the image data in the GUI and in response to the second user interaction, the digital television model in a second configuration in which the digital television model is (i) repositioned over the anchor relocated on the horizontal surface and (ii) in a stand-supported configuration based at least in part on determining that the anchor is relocated from the floor surface to the horizontal surface.

2. The system of claim 1, wherein identifying the horizontal surface comprises determining that a difference between the first height and the second height exceeds a predetermined threshold.

3. The system of claim 1, wherein:
   displaying the digital television model in the first configuration comprises presenting the digital television model in the GUI positionable vertically within the physical environment; and
   displaying the digital television model in the second configuration comprises presenting the digital television model in the GUI at a fixed vertical position within the physical environment.

4. The system of claim 1, wherein the instructions further cause the one or more processors to:

receive a third user interaction with the GUI, the third user interaction adjusting a position of the anchor:
adjust a position of the digital television model in the GUI based at least in part on the third user interaction;
receive a fourth user interaction with the GUI, the fourth user interaction adjusting an angle of the anchor; and
adjust an angle of the digital television model in the GUI based at least in part on the fourth user interaction.

5. A computer-implemented method, comprising:
receiving image data from an image sensor, the image data corresponding to a physical environment;
presenting the image data in a graphical user interface (GUI) of a user device;
identifying a first horizontal surface positioned at a first height within the image data;
identifying a second horizontal surface positioned at a second height within the image data, the second height identified as being greater than the first height;
receiving a digital object model from a database, the digital object model corresponding to an item selected by a user;
receiving a first user interaction with the GUI, the first user interaction locating an anchor on the first horizontal surface based at least in part on determining a first intersection between a first ray, originating from the user device, and the first horizontal surface;
displaying, in response to the first user interaction that located the anchor on the first horizontal surface, the digital object model in the image data above the anchor in the GUI in a first configuration configured to be coupled to one or more walls of the physical environment;
receiving a second user interaction with the GUI, the second user interaction relocating the anchor from the first horizontal surface to the second horizontal surface based at least in part on determining a second intersection between a second ray, originating from the user device, and the second horizontal surface; and
displaying, in response to the second user interaction that relocated the anchor from the first horizontal surface to the second horizontal surface, the digital object model in the image data above the anchor in the GUI in a second configuration configured to be supported by the second horizontal surface.

6. The computer-implemented method of claim 5, wherein in the first configuration, the digital object model is positionable vertically within the image data, and in the second configuration, the digital object model is at a fixed height above the second horizontal surface.

7. The computer-implemented method of claim 5, wherein in the second configuration the digital object model comprises a digital object model for a supporting device of the item.

8. The computer-implemented method of claim 5, wherein receiving the first user interaction and locating the anchor comprises initially locating the anchor on the first horizontal surface at a predetermined horizontal distance from the image sensor, and wherein displaying the digital object model comprises initially placing the digital object model at a height of the image sensor above a first horizontal surface.

9. The computer-implemented method of claim 5, further comprising adjusting a position of the anchor within the image data based at least in part on raycasting.

10. The computer-implemented method of claim 9, wherein an angle of a surface of the digital object model with respect to the user is maintained as the position of the anchor is adjusted within the image data.

11. The computer-implemented method of claim 5, further comprising adjusting an angle of the digital object model based at least in part on a user input to the GUI aligning an alignment feature of the anchor with a plane of the one or more walls.

12. The computer-implemented method of claim 5, further comprising projecting a grid onto a wall within the image data to aid a user in vertical positioning of the digital object model when the anchor is located on the first horizontal surface.

13. The computer-implemented method of claim 5, further comprising:
projecting a grid to aid a user in positioning the anchor on the first horizontal surface when the anchor is located on the first horizontal surface; and
projecting the grid on the second horizontal surface when the anchor is located on the second horizontal surface.

14. The computer-implemented method of claim 5, further comprising causing the image data to be displayed with the digital object model at the GUI.

15. One or more non-transitory computer-readable media having stored thereon instructions that, upon execution by one or more processors, cause the one or more processors to:
receive image data from an image sensor;
present the image data in a graphical user interface (GUI) of a user device;
identify a first horizontal surface positioned at a first height within the image data;
identify a second horizontal surface positioned at a second height within the image data, the second height identified as being greater than the first height;
receive a digital object model from a database, the digital object model corresponding to an item selected by a user;
receive a first user interaction with the GUI, the first user interaction locating an anchor on the first horizontal surface based at least in part on determining a first intersection between a first ray, originating from the user device, and the first horizontal surface;
display, in response to the first user interaction that located the anchor on the first horizontal surface, the digital object model within the image data above the anchor in the GUI in a first configuration configured to couple to one or more walls in a physical environment;
receive a second user interaction with the GUI, the second user interaction relocating the anchor from the first horizontal surface to the second horizontal surface based at least in part on determining a second intersection between a second ray, originating from the user device, and the second horizontal surface; and
display, in response to the second user interaction that relocated the anchor from the first horizontal surface to the second horizontal surface, the digital object model within the image data above the anchor in the GUI in a second configuration configured to be supported by the second horizontal surface.

16. The one or more non-transitory computer-readable media of claim 15, wherein the instructions comprise further instructions that, upon execution by the one or more processors, cause the one or more processors to adjust a position of the anchor within the image data based at least in part on a user input.

17. The one or more non-transitory computer-readable media of claim 15, wherein receiving the first user interaction and locating the anchor comprises initially locating the anchor on the first horizontal surface at a predetermined horizontal distance from the image sensor and displaying the digital object model comprises initially placing the digital object model at a height of the image sensor.

18. The one or more non-transitory computer-readable media of claim 15, wherein in the first configuration, the digital object model is positionable vertically within the image data, and in the second configuration, the digital object model is at a fixed height above the second horizontal surface.

19. The one or more non-transitory computer-readable media of claim 18, wherein in the second configuration the digital object model comprises a digital object model for a plurality of items belonging to a single item category.

20. The one or more non-transitory computer-readable media of claim 15, wherein identifying the first horizontal surface and the second horizontal surface is based at least in part on the second height exceeding the first height by a predetermined threshold.

* * * * *